United States Patent [19]

Mann

[11] 3,907,430

[45] Sept. 23, 1975

[54] OPTICAL BANDPASS FILTER

[75] Inventor: Michael Martin Mann, Redondo Beach, Calif.

[73] Assignee: Northrop Corporation, Los Angeles, Calif.

[22] Filed: Aug. 13, 1973

[21] Appl. No.: 388,026

[52] U.S. Cl. ............... 356/100; 350/168; 350/286
[51] Int. Cl.² ....................... G01J 3/14; G02B 5/04
[58] Field of Search .......... 350/286, 287, 168, 266; 356/74, 99–101

[56] References Cited
UNITED STATES PATENTS

| 2,227,510 | 1/1941 | Pineo | 356/101 |
| 2,721,259 | 10/1955 | Krasno | 250/266 X |

*Primary Examiner*—Ronald L. Wibert
*Assistant Examiner*—F. L. Evans
*Attorney, Agent, or Firm*—Edward A. Sokolski

[57] ABSTRACT

A tunable optical bandpass filter arrangement which, in a preferred embodiment, exhibits an output which is collimated and co-linear (with the input) and has relatively low transmission losses, together with capability for multi-bandpass operation as well as for non-critical tuning and for correction of optical aberrations, this done automatically over an entire wavelength region, to thus constitute an attractive filter for applications such as intra-cavity line section with multi-line, broad band, lasers, especially at higher power, and useful for rapid scan spectroscopy, for selective photolysis or the like.

25 Claims, 5 Drawing Figures

OPTICAL BANDPASS FILTER

The invention herein described was made in the course of, or under, ARPA-ONR Contract No. N00014-72-C-0043 with the U.S. Department of the Navy, Office of Naval Research.

This invention relates to improved optical filtering systems and more particularly to those adapted for filtering only selected wavelengths from a bandwidth, leaving it otherwise relatively unaffected. More specifically, in one embodiment, the invention involves a filter system adapted to accept a collimated input radiation beam with a prescribed wavelength spectrum, and refractively disperse its spectrum, then filter out certain wavelengths (e.g., by mechanically blocking their passage) and then refractively and symmetrically reconstitute the bandwidth, converting it back to the original with no appreciable distortion, and leaving it co-linear with, and collimated with the entrant beam while also, preferably correcting for any astigmatism — so that the only substantial change in the emergent spectrum will be the removal of selected wavelengths from the entrant spectrum.

Prior art arrangement for effecting such results, have been entirely too complicated and unreliable and/or have exhibited certain shortcomings. For instance, they have typically distorted the emergent beam so that, as recombined, all the entrant wavelengths (not filtered out) were not spatially aligned and coincident with the entrant beam. Conventional dispersive means (e.g., monochromators) shift the angular and/or spatial relation of at least some of the emergent wavelengths. Also, most such filtering systems are relatively difficult and/or complex to tune, and in any event, typically cause "shifts" as above mentioned. Filtering systems according to this invention provide a scanning capability that is faster and simpler, having only a few low-inertia elements with no fussy tolerances.

BACKGROUND, PROBLEMS, INVENTION FEATURES

An ideal filter arrangement for applications like those described will be one that can accept input radiation which is collimated and performs its filtration without substantially upsetting radiation characteristics. Also, it will, preferably, do this without introducing substantial transmission losses, and without introducing optical aberrations — or else will correct these — over the entire spectrum and preferably automatically. Moreover, such an "ideal filter" will also have multibandpass capability, handling a variety of different bandwidths, permit selection of different outer band limits (upper and/or lower wavelengths) in the bandpass; yet it will be so without particularly critical or fussy tuning adjustments being required. Unfortunately, however, as workers in the art well know, it is practically impossible to secure such an ideal filter arrangement with all these features, particularly when one wishes to avoid complex mechanisms with limited reliability and having a reasonably long service life.

The present invention is intended to solve at least some of the foregoing problems and provide associated features of advantage. For instance, in one embodiment it serves as a symmetrical optical bandpass filter with a simple pass-aperture and operates to render an output beam with essentially the same properties as the input beam, avoiding such distortions as astigmatism and being self-compensating. In another embodiment, such features are exhibited in a simple mechanical scanning monochromator using a simple rotating slotted wheel serving as a moving, variable-size, -position pass aperture. A third embodiment provides an unstable confocal ring resonator wherein the same kind of filtering is provided. In all embodiments, a pair of (positive/negative) dispersive elements are employed for first spreading a beam, then merging and reconstituting it.

Accordingly, it is an object of this invention to provide solutions to the foregoing problems and advantages as indicated. It is a related object to provide improved bandpass filter arrangements of the type indicated. More particularly, it is an object to provide such radiation filtering arrangements which facilitate selection of the upper and lower wavelength limits of the bandpass. Another object is to provide such a filter allowing multi-bandpass operation. A further object is to provide such a filter wherein tuning may be effected very simply and reliably, such as with refracting dispersive elements and with no critical adjustments required. Yet another object is to provide a filter arrangement introducing no significant transmission losses. Still another object is to provide such a filter exhibiting optical aberrations which are either minimal in themselves, or are automatically correctable, over the entire spectrum. Yet another object is to provide such a filter with an output which does not distort the collimation or co-linearity of output with input. A more particular object is to provide such a filter using two pairs of dispersive prisms, each pair being dispersed on opposite sides of the filter selection station and arranged so as to disperse the spectrum and merge it, respectively. Another object is to provide such a system comprising two symmetric pairs of symmetrically-opposed, refractive prisms. Yet another object is to provide such a filter system in conjunction with an unstable confocal ring resonator arrangement, especially adapted for intracavity line selection in a laser.

The above and other objects and advantages of the invention will become apparent from the following description, taken in conjunction with the accompanying drawing of an illustrated embodiment thereof, in which.

FIRST EMBODIMENT

Figure 1:
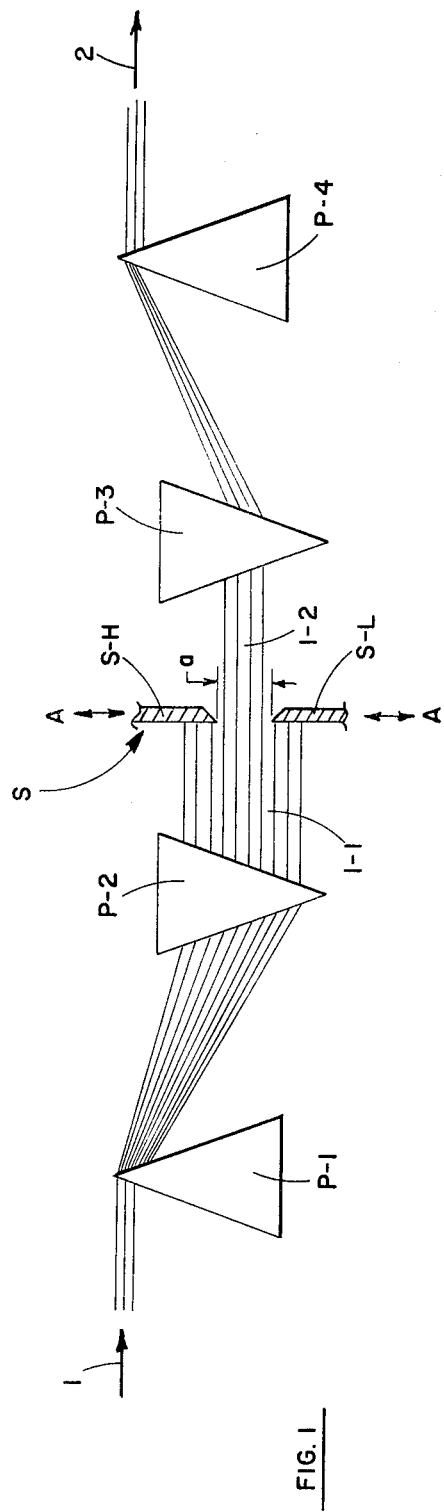
FIG. 1 is a simplified schematic drawing of a symmetrical optical bandpass filter embodiment of the invention, with two pairs of dispersive prisms, disposed upstream and downstream of line selecting pass aperture means; with modified aperture, FIG. 1A.

Referring to FIG. 1, there is shown an entrant radiation beam 1 which will be understood as suitably collimated and extending over a prescribed bandwidth. This beam is to be projected through a dispersive system comprising a paired prism array ($p1$, $p2$), then passed through pass aperture means (stop S) for wavelength selection and thereafter reconstituted by transit through a second paired prism array ($p3$, $p4$) — matched with the first array — the bandwidth being thus reconstituted and merged into exit beam 2. Exit beam 2 is intended to be colinear with entrant beam 1 and likewise collimated, with the bandwidth essentially identical to the entrant bandwidth and all wavelengths in the same (e.g., angular and positioned) relationship, except that some wavelengths will, of course, have been (selectively) removed by the apertured block (Stop S).

For conceptual simplicity in this drawing, beam 1 is shown an entering the system parallel to the base of the first prism, $p1$, although in practice it would be preferable to minimize scattering losses by entry at "Brewster angle," (for the central wavelength in the subject bandwidth). As workers in the art will appreciate, one simply manipulates the angular orientation of the prism angle so that, at this (central) wavelength, the exit beam 2 is also at Brewster angle. For conceptual purposes, entry beam 1 is here illustrated as consisting of three discrete wavelengths, although, of course, the system can (and typically will) function with a wavelength continuum comprising virtually any number of adjacent wavelengths. Alignment may be performed with any representative wavelength (e.g., visible, "He-Ne laser standard", etc.).

PRISMS

The "entry dispersive array" (paired prisms $p1/p2$) acts to disperse the entire entry bandwidth with these symmetrically complementary refractive elements, in a manner that will spread out the beam to a prescribed, considerable degree. Generally speaking, the beam is to be so dispersed by the first prism $p1$ and then reconstituted to be collimated, as displaced, by the second prism $p2$. This $p2$ is to be the optical complement of $p1$, refracting and dispensing all wavelengths in negative symmetry therewith. Of course, as workers will appreciate, other analogous means may be employed for such an entry dispersive array.

As a particular example of this function, one might visualize that the dispersion effected by the first prism $p1$ results in refraction of the three sample wavelengths shown into three beams exiting at different angles, displaced from one another a prescribed amount. The beams at this point will also be astigmatic (and thus produce a distorted output unless corrected for, of course).

Thus, the beams, so dispersed and spread-out, are refracted through the second prism $p2$, orientated as shown and constructed and functioning as the precise symmetrical complement of prism $p1$. For instance, each prism may comprise a matching flint glass prism (for visible), adjustably positioned relative to one another and the other system elements by conventional, known mounting means, including respective adjustable alignment means adapted to shift their relative angular disposition.

This second (downstream) prism $p2$ has substantially the same dispersive properties as the first (lest the passing spectrum be attenuated) and will be positioned in symmetrical opposition thereto, being rotated 180° from the attitude of the first prism. The light rays emerging from the first prism (to diverge along different directions) will be rendered parallel once again (collimated after traversing this second prism.

This "anti-symmetrical" disposition of the two prisms in each pair to collimate the output beam therefrom is somewhat novel in relation to line selection means (especially apertured). In the prior art, rotatable refractive elements have been used for radiation bandwidth tuning, such as in spectrometers, but such systems typically exhibit the inherent drawbacks and limitations of "high inertia" mechanical components — the result being slower scan rates and alignment speed, with more criticality in alignment and with variable, unknown reflection/-refraction losses — all of the above being avoided with the subject invention.

The beams then exiting $p2$ will proceed to the selection aperture $a$ (along plane A—A) in stop (or block means) S in a parallel, dispersed mode, being somewhat displaced from one another more than at the entry beam 1. The beam thus spread (1-1) is passed through the aperture means $a$ (or its equivalent as discussed below), and, with selection thus effected (beam 1-2), is reconstituted by transit through the downstream "merging array" (preferably, paired prisms $p3/p4$) for a "negative dispersion" matched with the prior positive dispersion — in an embodiment like this — prisms $p3/p4$ being preferably identical to prisms $p2$ and $p1$, respectively, and disposed to that the entire prism array is symmetrical about selection plane A—A, as will be seen. Since the exit radiation beam 2 is comprised of parallel rays, viewing or recording means may be placed at any convenient distance beyond the exit prism $p4$. Micrometer lead screws may be used to conventionally control the positioning of the aperture edges and/or of the prism tables. The four prisms may be aligned conventionally, for instance, using a standard (collimated) source of the contemplated wavelength region (autocollimator). For instance, when used with a color photographic enlargement system, the system would be aligned and referenced with a light source of the contemplated color (temperature). For laser applications, a laser source would be used; similarly, with IR or UV optics.

All prism housings would preferably have conventional adjustments for alignment and positioning thereof, the prisms being mounted kinematically to allow ready interchangability.

APERTURE

The entry beam 1, now spread and collimated at 1-1 is presented to stop S, so that selected, desired portions thereof are disposed to be passed through pass-aperture $a$ to form filtered beam 1-2, the opaque, non-transmitting (to subject radiation) portions (e.g., upper/lower stop section S-H/S-L) acting to block the non-desired wavelengths. Stop S may thus comprise a single aperture $a$ (vs. multi-aperture stop S', FIG. 1A) defined by a high-pass (upper) blocking segment S-H and a like low-pass (lower) segment S-L (preferably by knife-edges thereof). Those segments are disposed (preferably moveably) and adapted to "trim away" the outer (upper/lower) wavelengths in the subject entry beam 1-1. This stop S is, as suggested, mounted and arranged to be translated, either as a unit or separately (each segment), along its aperture-axis A—A by means (not shown) well known in the art (e.g., pair of opposed lead screws for each segment). Of course, separate translations can serve to vary the passing width of the aperture as defined by those segments.

Figure 1A:
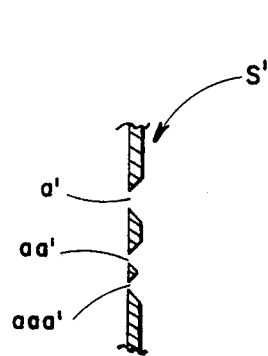

Alternatively, line selection may be similarly effected with other blocking means, preferably selectably-positionable and for selectable-aperture(s) size. For instance, a modified multi-aperture stop S' is illustrated in FIG. 1A and intended to be substitutable for stop S in FIG. 1 where it is desired to pick-out one, or several, wavelength-sections, rather than merely "trim" the over-all band width. Thus, step S' provides a plurality of apertures $a'$, $aa'$, $aaa'$, defined by associated opaque blocking elements as before; preferably being selectably variable in dimension and/or position. Thus, according to a feature hereof, and as a result of this symmetrical dispersing/merging prism system, the lines exiting the final prism (exit beam 2) are co-linear with the entrant beam 1 and otherwise essentially identical therewith (except for filtering), with all astigmatism corrected. The matched-complementary optical symmetry of the system provides this result. That is, the upstream dispersive prism array $p1$–$p2$ and the downstream merging prism array $p3$–$p4$ provide that each line in exit beam 2 have the same relative disposition, properties, etc. as the corresponding line in entry beam 1, with all distortions such as astigmatism being self-compensating, independent of the initial phase front. A filter system like this can, of course, be interposed at any point in the optical path as long as any increase in path length is accounted for.

The results achieved with a system like this will be surprising. Line selection being effected so simply and the balance of the radiation being left so relatively undisturbed will surprise those working in this art.

MODIFICATION A

As a modification of the foregoing embodiment in FIG. 1, the system may be converted into a variable-slit, readily-tunable bandpass filter by simply substituting variable aperture means at selection plane (A—A) as suggested above. Preferably, selectably positioned blocks with various sized aperture $a'$, $a''$, $a'''$, are arranged to be displaced in the adjustment direction (indicated by the arrows) as in FIG. 1A. Such a displaceable aperture arrangement in useful. For instance, workers will recognize that transverse positioning adjustment of the opaque blocks, in synchronism, can thereby determine the size and location of the central bandwidth and/or determine the location (upper and lower edges) of the spectrum passed according to the positions of the edges defining the selection apertures. These edges can, of course, be maintained at a constant spacing from one another or this spacing varied (varying bandpass width).

For instance, the prism system $p1$–$p2$ is arranged to produce a spectrum of prescribed width in the plane of the selection slit (e.g., $a'$) and is aligned to be collimated there. The slit edges may be positioned to accommodate this bandwidth and its location.

MODIFICATION B

Figure 2:
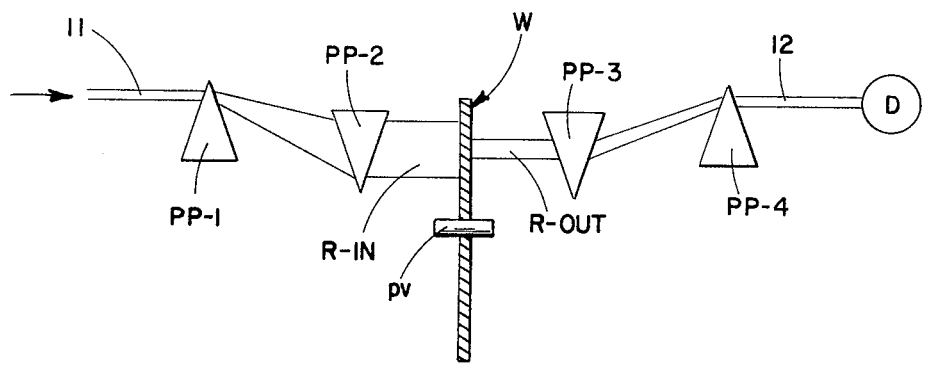
FIG. 2 is a schematic simplified diagram of an embodiment like that in FIG. 1, but modified to employ a rotating, slotted wheel as the line selection means; with the wheel shown in elevation in FIG. 2A.
Figure 2A:
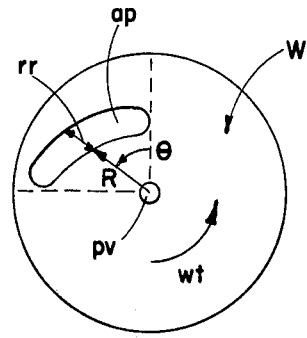

As another modification of the foregoing embodiment (FIG. 1), the mechanical stop means S in FIG. 1 is rendered variable-width/-position in a prescribed mode, by replacing it with a rotating slitted wheel W as seen in FIG. 2. Here wheel W is arranged in conjunctive operative operative association with a dispersive/merging prism system $pp1/pp2$ and $pp3/pp4$, that is otherwise relatively the same as that described above in the FIG. 1 embodiment. In this embodiment, the entrant radiation beam 11 is similarly processed except that line selection is variable over a prescribed, repeatable (scan) period. Here, detection means D may also be provided for detecting (recording) characteristics of the output (exit beam 12). The rotating slitted wheel W (or like scanning aperture) is shown in frontal elevation if FIG. 2A, considerably simplified, and will be understood by those skilled in the art to comprise a scanning aperture $ap$ adapted for bandwidth sampling. Aperture $ap$ is intended to receive a prescribed input radiation bandwidth R-IN and pass only selected portions thereof, in a time-varying (periodic) mode, to emerge as output beam R-OUT (FIG. 2). Wheel W will be understood as suitably mounted and rotated with a prescribed frequency $w$ in a prescribed synchronism with any output means (e.g., detector D). Aperture (slit) $ap$ is (preferably) of constant radial height $rr$, but is positioned to present this (constant-height) aperture at different time-dependent band segments — corresponding to different radial distances R from the center of the wheel. Distance R is equivalent to band-height and is varied with time (rotation) at various displacement angles ($\theta$) along a 90° (quarter) sector of the wheel. Thus, if distance R and angle $\theta$ may be related by:

$$R = K\theta + C$$

then, for example, an approximately linear scan of wavelength versus time (or angle) may be obtained in the manner of a scanning monochromator, yet quite simply. That is, by replacing the bandpass stops in FIG. 1 or FIG. 1A with the rotating slotted wheel W, a simple scanning spectrophotometer can be provided; one that is not only simple in construction and easy to operate, but is quite fast (in speed and response), with a relatively high scan rate, using very low-inertia components. Wheel W may be conventionally mounted and (spin-) balanced. With such a simple, light scanning wheel, it will be unnecessary to rotate and manipulate the usual critical high-inertia components, such as prisms or gratings, and rather high scan rates may be achieved according to this feature, with relatively simple easily aligned mechanisms.

Alternatively, a wheel like W may be tilted about the beam axis sufficiently to give a prescribed "non-linear" scan, as will be understood in the art.

MODIFICATION C

Intra-Cavity Line Selection

Figure 3:
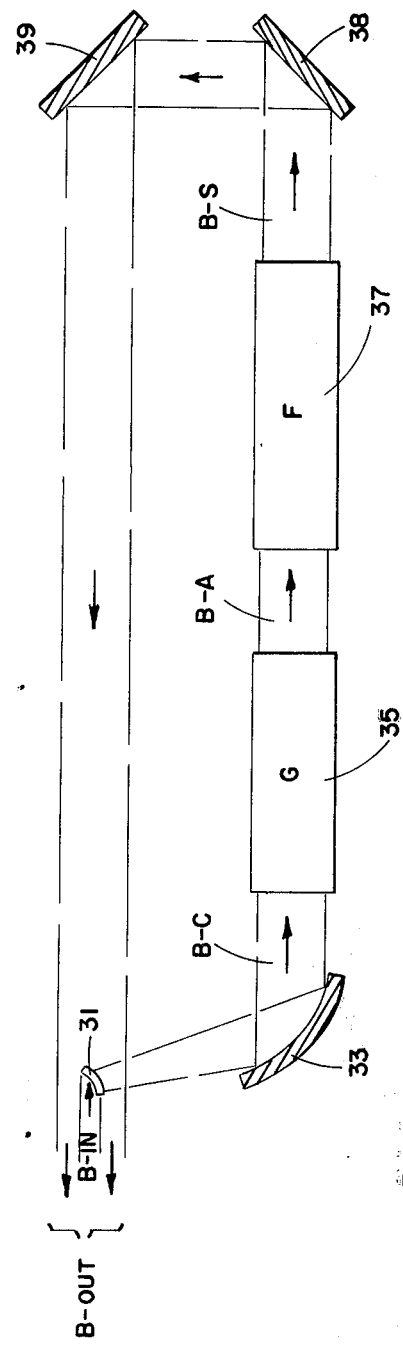
FIG. 3 is a simplified schematic diagram of a filter arrangement like that of FIGS. 1 or 2, as employed in conjunction with an unstable confocal resonator system.

According to another embodiment, shown in FIG. 3, a filter arrangement according to the subject invention may be employed for line selection within a resonator; i.e., as a filter assembly located within an oscillator resonator for multi-line or broad-band lasers.

More particularly, as indicated in FIG. 3, a line selector 37 (F) will be understood as disposed for intra-cavity line selection in an unstable, confocal ring resonator arrangement known in the art. That is, the input beam B-IN will be understood as dispersed by refractive segment 31 and reconstituted in collimated, spaced parallel form by transit through a like refractive setment 33 (matched with 31, as for prior embodiments) to form the parallel collimated rays of beam B-C. Beam B-C is then projected through the gain medium 35 (for instance, comprising the longitudinal discharged tube used, as known in the art, as part of such a resonator) emerging therefrom as amplified beam B-A. Beam B-A is then projected through selector (filter) system 37 and, after undergoing line selection there (in the afore-indicated manner), emerges as "filtered" beam B-S, to be redirected by reflectors 38, 39 and projected as ultimate output beam B-OUT. The filtering (line selection) means 37, will be understood to comprise a filter assembly along the lines described above with respect to FIGS. 1 and 2, adapted for this arrangement. In this case, the filter device will also function to select a single direction of propagation in the ring resonator since, in the forward direction, the beam is collimated and propagates through the device without distortion; while, in the opposite direction, the beam diverges. Thus, the device can be designed to produce high loss for modes propagating in the reverse direction.

Of course, workers skilled in the art can visualize other implementations of the foregoing concepts. For example, while the embodiments as described have employed prisms as the dispersive/mergent elements, it will be visualized that other methods and means can be used such as optical grating systems.

Moreover, since certain changes may be made in the above products and techniques without departing from the scope of the invention treated here, it is intended that all matter contained in the above description and shown in the accompanying drawings shall be interpreted as illustrative and not in a limiting sense, being defined and limited only by the appended claims.

What is claimed is:

1. An improved technique for optical filtering and removal of selected lines from a prescribed radiation bandwidth, doing so without otherwise significantly affecting radiation characteristics such as relative spatial or angular relationship of the rest of the lines, this technique comprising in combination:

projecting the entrant bandwidth through prescribed dispersive means functioning to spread the band and then recombine it, collimatingly without significant distortion; projecting the resultant spectrum through a first prescribed mergent means matched in characteristics with said dispersive means and so disposed with respect thereto as to produce a prescribed expanded bandwidth representing said original input lines, however, spaced apart further and kept collimated intercepting prescribed radiation lines to remove them with prescribed opaque stop means;

merging the resultant "filtered" bandwidth using prescribed mergent means functioning to merge this bandwidth and recombine it, collimatingly and without significant distortion reconstituting and recollimating the resultant spectrum so merged with prescribed companion collimation means matched with said mergent means and disposed with respect thereto to produce a collimated output substantially the same as said input and colinear therewith, except for said line removal; said dispersive means and mergent means being matched in symmetrical complementarity.

2. The technique recited in claim 1 wherein said entrant bandwidth is first spread by projecting it through a first spreading dispersive element and then recombined by projecting through a prescribed recombining element matched in characteristics with said dispersive element and so disposed with respect thereto as to produce a prescribed expanded bandwidth representing the original input lines, but being spaced further apart and kept collimated;

and wherein the said "merged" bandwidth is likewise projected through recombination means to reconstitute and recollimate the resultant spectrum so merged; said recombination means being matched in characteristics with said mergent means and so disposed with respect thereto as to produce a prescribed merged bandwidth representing the original entrant bandwidth with the lines being kept collimated and colinear therewith.

3. The technique as recited in claim 2 wherein said dispersive means comprises refracting prism means; wherein said recombination element comprises a prism matched in characteristics with said dispersive means and is disposed in symmetrical opposition thereto; wherein said mergent means comprises a second refractive prism means and the associated recombination means comprises a prism means matched in characteristics with said mergent prism means and disposed in symmetrical opposition thereto.

4. The technique recited in claim 3 wherein said filtering is effected by blocking stop means, opaque to said radiation and positioned to intercept the lines selected for removal.

5. The combination as recited in claim 4 wherein said removal is effected by a multiline selective stop means adjustably positionable to block only the lines selected for removal and to "pass" a plurality of bandwidth segments.

6. The combination as recited in claim 3 wherein said line selection is effected in "variable segment" fashion with scanning variably-positioned pass-aperture means arranged to periodically present at least one aperture slit across at least a portion of the bandwidth for "passage" thereof.

7. The combination as recited in claim 6 wherein said selection is effected by a rotating slitted blocking-disc array.

8. An improved arrangement for optical filtering and removal of selected lines from a prescribed radiation bandwidth adapted to do so without otherwise significantly affecting radiation characteristics such as relative spatial or angular relationship of the non-selected lines, this arrangement comprising in combination:

entrant dispersal means for projecting the entrant bandwidth and including a prescribed dispersive array, for spreading the band and then recombining it, collimatingly and without significant distortion;

filter means including prescribed stop means opaque to said radiation for intercepting the selected radiation lines from said dispersal means to remove them; and exit merging means arrayed to merge the resultant "filtered" bandwidth and including a prescribed mergent array for merging this bandwidth and recombining it, collimatingly and without significant distortion, to produce a collimated exit bandwidth substantially the same as said entrant bandwidth and colinear therewith, except for said line removal; said dispersive and mergent arrays being matched in symmetrical complementarity.

9. The arrangement as recited in claim 8 wherein said disperal means comprises a refracting prism plus a recombination element combined therewith, said element comprising a prism matched in characteristics with said refracting prism and disposed in symmetrical opposition thereto; wherein said merging means comprises a second refractive prism plus an associated recombination means comprising a prism matched in characteristics with said second prism and disposed in symmetrical opposition thereto.

10. The arrangement as recited in claim 9 wherein said filter means comprises blocking stop means opaque to said selected radiation lines and arranged so as to block them.

11. The combination as recited in claim 10 wherein said filter means comprises a multiline selective stop means, adjustably positionable to block only the lines selected for removal.

12. The combination as recited in claim 10 wherein said filter means comprises variably-positioned pass-aperture means arranged to scan the bandwidth and periodically present at least one aperture slit across at least a portion of the bandwidth for effecting passage thereof at predetermined intervals.

13. The combination as recited in claim 12 wherein said filter means comprises a rotating slitted blocking-disc.

14. The combination as recited in claim 10 wherein said dispersal means comprises a pair of matched dispersing and collimating prisms and wherein said merging means comprise a pair of matched merging-collimating prisms, complementary with said dispersing-collimating pair, the prisms in each pair being disposed in symmetrical opposition so as to auto-correct for distortion.

15. The combination as recited in claim 8 wherein said filter means comprises stop means including adjustably positionable aperture means.

16. The combination as recited in claim 15 wherein said stop means comprises a multiline selector stop.

17. The combination as recited in claim 15 wherein said stop means comprises a scanning aperture means.

18. The combination as recited in claim 17 wherein said stop means comprises a rotating slitted wheel.

19. The combination as recited in claim 18 wherein the scanning slitted wheel is arrayed as a scanning monochromater for a spectral radiation beam.

20. The combination as recited in claim 8 wherein the filtering arrangement comprises a band-pass filter arrayed in operative association with a laser radiation source and is adapted to filter the output thereof.

21. The combination as recited in claim 8 wherein the filtering arrangement is arranged as a line selection means in operative combination with ring resonator means.

22. The combination as recited in claim 21 wherein said resonator means comprises an unstable confocal ring resonator; wherein dispersing and associated collimating means are arranged to process an input beam and present it to an amplifying stage which is, in turn, arranged at the input of line selection means, from which the "filtered" radiation output is taken.

23. An improved filtering system adapted to select and remove at least one radiation wavelength segment from a given bandwidth without otherwise significantly affecting the bandwidth and so as to self-compensate for any distortion, this system comprising, in combination:

line clipping means; and positive and negative dispersive means arranged, respectively, upstream and downstream of the clipping means; said positive and negative dispersive means comprising an entry array of optical dispersive means and an exit array of optical mergent means respectively, said arrays being matched and complementary and each comprising a pair of symmetrically opposed refractive elements;

said clipping means comprising opaque radiation blocking means together with one or more pass-aperture means having a width and location such as to pass only selected, "non-removed" portions of said bandwidth.

24. The combination as recited in claim 23 wherein said dispersive and mergent means comprise a pair of dispersing, optically-refractive arrays, each array being arranged and disposed on opposite sides of said clipping means, said clipping means being disposed and adapted to function as a line-selecting filter station.

25. The combination as recited in claim 24 wherein each optically refractive array comprises a pair of matched, symmetrically-opposed prisms adapted to pass the subject radiation bandwidth and to disperse it, positively or negatively, to a prescribed, relatively uniform degree.

* * * * *